US012673561B2

(12) United States Patent
Dong et al.

(10) Patent No.: US 12,673,561 B2
(45) Date of Patent: Jul. 7, 2026

(54) VEHICLE STRUCTURE REINFORCEMENT FOR PROTECTING A BATTERY PACK

(71) Applicant: FCA US LLC, Auburn Hills, MI (US)

(72) Inventors: Yuanxia Dong, Shanghai (CN); Zi Ye Wang, Shanghai (CN); Xingjia Li, Shanghai (CN); Kieran Ji, Shanghai (CN); Xiu Min Song, Shanghai (CN)

(73) Assignee: FCA US LLC, Auburn Hills, MI (US)

( * ) Notice: Subject to any disclaimer, the term of this patent is extended or adjusted under 35 U.S.C. 154(b) by 308 days.

(21) Appl. No.: 18/524,091

(22) Filed: Nov. 30, 2023

(65) Prior Publication Data

US 2025/0178458 A1     Jun. 5, 2025

(51) Int. Cl.
B60L 50/64          (2019.01)
B60L 50/60          (2019.01)
B60K 1/04              (2019.01)

(52) U.S. Cl.
CPC ............... B60L 50/64 (2019.02); B60L 50/66 (2019.02); B60K 2001/0438 (2013.01)

(58) Field of Classification Search
CPC . B60L 50/64; B60L 50/66; B60K 2001/0438; B62D 25/2027
USPC ......................................................... 180/311
See application file for complete search history.

(56) References Cited

U.S. PATENT DOCUMENTS 8,051,934 B2 * 11/2011 Kiya ................... H01M 50/244
                                             180/274
8,919,473 B2 * 12/2014 Bisror .................. B60L 3/0046
                                             180/311
10,822,035 B2 * 11/2020 Takahashi .......... B62D 25/2018

FOREIGN PATENT DOCUMENTS

CN        205890987 U       1/2017
CN        116917194 A       10/2023
FR          3001185 A1 *     7/2014   .............. B60L 50/64
FR          3094326 A1      10/2020
JP        2009087645 A  *    4/2009   .............. B60K 1/04
WO    WO-2016060091 A1 *     4/2016   ............. B62D 25/20

OTHER PUBLICATIONS

JP-2009087645-A English Translation (Year: 2009).*
FR-3001185-A1 English Translation (Year: 2014).*
WO-2016060091-A1 English Translation (Year: 2016).*

* cited by examiner

*Primary Examiner* — Michael T. Walsh

(74) *Attorney, Agent, or Firm* — Jeremy J. Klobucar

(57)                  ABSTRACT

A vehicle structure includes a first and second longitudinal support member having a respective first and second spar. A first floor side member and a second floor side member have respective first and a second front ends. The first and second floor side members are disposed adjacent to the first and second longitudinal support members. Front and rear cross members extend between the first floor side member and the second floor side member. A floor extends between and is coupled to the first floor side member and the second floor side member. First and second lateral stiffening brackets couple the front cross member to the first and second spars. A first longitudinal reinforcement bracket couples to the first floor side member and the first spar. A second longitudinal reinforcement bracket couples to the second floor side member and the second spar.

20 Claims, 7 Drawing Sheets

VEHICLE STRUCTURE REINFORCEMENT FOR PROTECTING A BATTERY PACK

FIELD

The present disclosure relates to a vehicle structure and, more particularly, to a vehicle structure reinforcement for protecting a battery pack.

BACKGROUND

This section provides background information related to the present disclosure which is not necessarily prior art.

Electric vehicles rely on battery cells bundled into one or more battery modules to power the vehicle. The battery cells mounted in the vehicle. The batteries are mounted so that they are protected during a crash. However, providing more protection for battery module during an impact is important.

SUMMARY

This section provides a general summary of the disclosure, and is not a comprehensive disclosure of its full scope or all of its features.

In one aspect of the disclosure, a vehicle structure includes a first longitudinal support member having a first spar. The structure also includes a second longitudinal support member may include a second spar extending toward the first spar. The structure also includes a first floor side member having a first front end, said first floor side member disposed adjacent to the first longitudinal support member. The structure also includes a second floor side member having a second front end, said second floor side member disposed adjacent to the second longitudinal support member. The structure also includes a front cross member extending between the first floor side member and the second floor side member. The structure also includes a rear cross member extending between the first floor side member and the second floor side member. The structure also includes a floor extending between and coupled to the first floor side member and the second floor side member. The structure also includes a first lateral stiffening bracket coupling the front cross member to the first spar. The structure also includes a second lateral stiffening bracket coupling the front cross member to the second spar. The structure also includes a first longitudinal reinforcement bracket coupled to the first floor side member and the first spar. The structure also includes a second longitudinal reinforcement bracket coupled to the second floor side member and the second spar.

Implementations may include one or more of the following features. The vehicle structure where the rear cross member may include an axle housing. The floor is adjacent the axle housing. The floor is coupled to the front cross member. The floor is coupled to the front cross member, the first floor side member, and the second floor side member. The first lateral stiffening bracket may include an L-shaped cross section. The first lateral stiffening bracket may include a first plate coupled to the front cross member, and the second lateral stiffening bracket may include a third plate coupled to the front cross member. The first lateral stiffening bracket may include second plate coupled to the front cross member and the first spar, and the second lateral stiffening bracket may include a fourth plate coupled the front cross member and the second spar. The front cross member may include a vertical wall and a flange portion extending longitudinally forward from the vertical wall. The first lateral stiffening bracket may include a first plate coupled to the vertical wall of the front cross member and a second plate coupled to the flange portion and the first spar, and wherein the second lateral stiffening bracket may include a third plate coupled to the vertical wall and a fourth plate coupled to the flange portion and the second spar. The first lateral stiffening bracket may include the second plate coupled to the front cross member and the first spar, and the second lateral stiffening bracket may include the fourth plate coupled to the front cross member and the second spar. The cross member does not extend laterally outward beyond the first front end and the second front end. The first longitudinal reinforcement bracket may include a first plate and a second plate. The first plate is coupled to the first floor side member. The first plate is coupled to a wall of the first floor side member. The second plate is coupled to a lateral plate of the first floor side member and the first spar. The first longitudinal reinforcement bracket may include a first plate welded to the first floor side member and the first spar, and the first lateral stiffening bracket may include a third plate welded to the front cross member and a second plate welded to the front cross member and the first spar. The first lateral stiffening bracket and the second lateral stiffening bracket are spaced apart by a lateral gap on the front cross member.

One general aspect of the vehicle structure includes a first longitudinal support member and a first spar. The structure also includes a second longitudinal support member may include a second spar extending toward the first spar. The structure also includes a first floor side member having a first front end, said first floor side member coupled to the first longitudinal support member. The structure also includes a second floor side member having a second front end, said second floor side member coupled to the second longitudinal support member. The structure also includes a front cross member extending between the first floor side member and the second floor side member, said front cross member may include a vertical wall and a flange. The structure also includes a rear cross member extending between the first floor side member and the second floor side member. The structure also includes a floor coupled to the front cross member, the first floor side member and the second floor side member. The structure also includes a battery module coupled under the floor. The structure also includes a first lateral stiffening bracket may include a first plate coupled to the vertical wall and a second plate coupled to the flange and the first spar. The structure also includes a second lateral stiffening bracket may include a third plate coupled to the vertical wall and a fourth plate coupled to the flange and the second spar. The structure also includes a first longitudinal reinforcement bracket may include a fifth plate coupled to the first floor side member and a sixth plate coupled a first lateral plate of the first floor side member and the first spar. The structure also includes a second longitudinal reinforcement bracket may include a seventh plate coupled to the second floor side member and an eighth plate coupled a second lateral plate of the first floor side member and the second spar.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
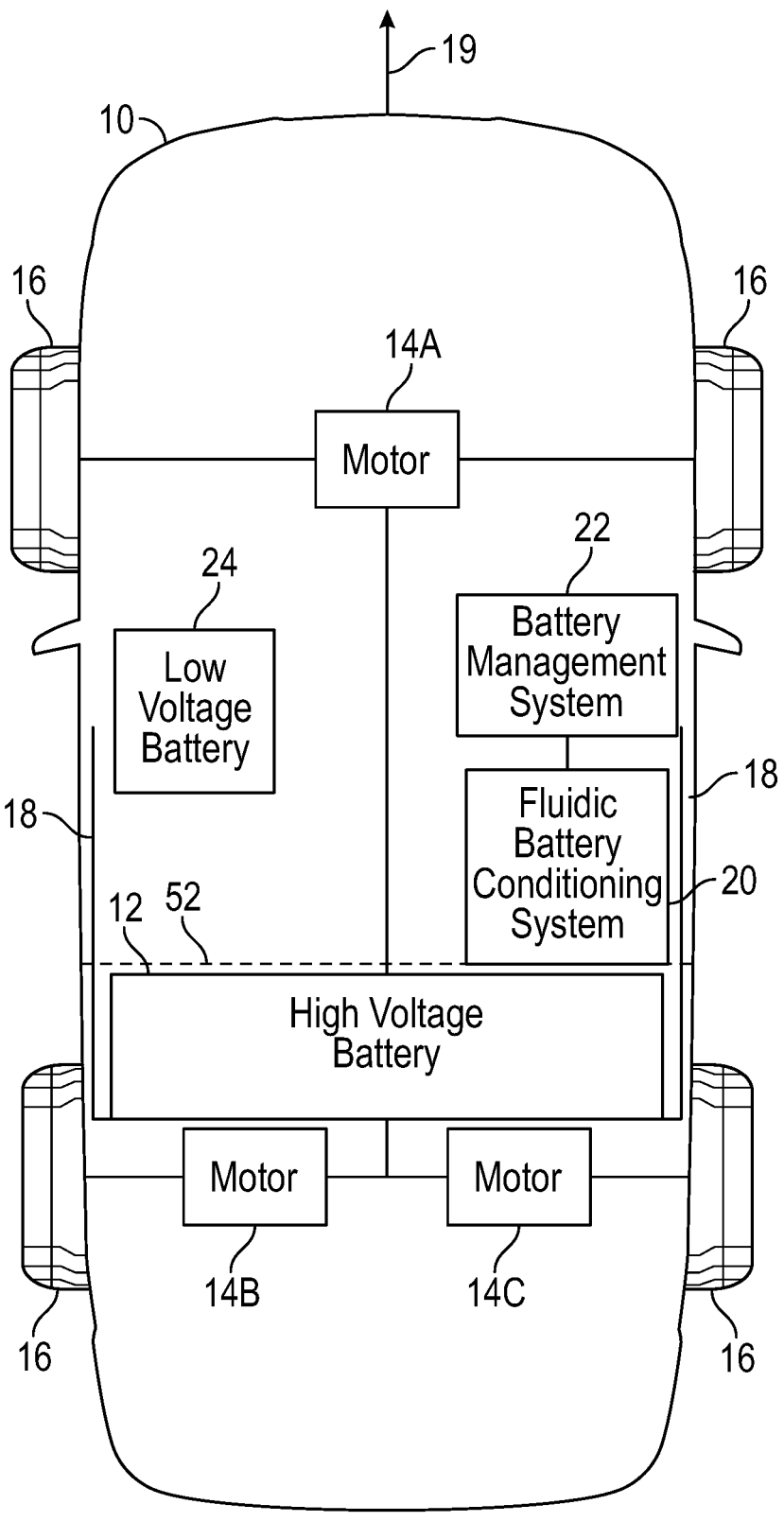
FIG. 1 is a high level block diagrammatic view of an electric vehicle.

Referring now to FIG. 1, a schematic block diagram of a vehicle 10 is illustrated. The vehicle 10 is adapted to include various features not illustrated such as a passenger compartment mounted thereon.

The vehicle 10 is an electric vehicle that has a high voltage battery 12 that is used to power one or more electric motors 14A, 14B and 14C. The electric motors 14A, 14C, 14C are used to provide motive force to the vehicle wheels 16. The number of motors within an electric vehicle may vary. Each of the wheels 16 may have their own motor associated therewith. As shown in the rear of the vehicle 10, each wheel has an electric motor 14B, 14C. One motor 14A is used to power the wheels at one end of the vehicle. The motors 14B and 14C power individual wheels 16.

The high voltage battery 12 may be coupled to a support structure 18, a portion of which is illustrated. The support structure 18 may be a traditional ladder type frame or portions of a unibody construction such as a sill member. The members of the support structure 18 illustrated run parallel to a longitudinal axis 19 of the vehicle 10. The terms longitudinal and lateral used to describe the positions of components in the vehicle 10 relative to the longitudinal axis 19. Further inboard refers to components positions toward the center or longitudinal axis 19 of the vehicle.

A fluidic battery conditioning system 20 may be used for controlling the temperature and pressure within the high voltage battery 12. A battery management system 22, in communication with the fluidic battery conditioning system 20 and any sensors associated with the high voltage battery 12, is used to control the operation of the fluidic battery conditioning system 20 as described in more detail below. The battery management system 22 is a microprocessor-based controller programmed to perform various steps used in the operation of the system.

The vehicle 10 also includes a low voltage battery 24 that has a voltage less than the high voltage battery 12. Examples for the low voltage battery 24 include but are not limited to a 12 volt or 48-volt battery. An example of a high voltage battery 12 is 400 volts plus or minus 50 volts.

Referring now to FIGS. 2A-2I, a partial vehicle structure is illustrated forming a battery securing structure 32. The battery securing structure 32 is coupled to the longitudinal support members 18. As mentioned above, the longitudinal support members 18 are disposed longitudinally relative to the vehicle and may be a frame or part of a unibody structure. The body securing structure 32 includes two floor side members 34. The floor side members 34 include a first flange 36 that is affixed to the longitudinal support members 18. The flanges 36 may be welded to the longitudinal support members 18. The floor side members 34 also include a lateral plate 38 that extends inward from the flange 36. The lateral plate 38 has a wall 40 that extends generally in a vertical direction relative to the vehicle. A member 42 may extend between the wall 40 and the flange 36.

The longitudinal support members 18 may have spars 50 extending laterally inwardly therefrom. The spars 50 may be integrally formed or welded to the longitudinal support members 18. The spars 50 are used to support a front cross member 52. The front cross member 52 extends laterally across the vehicle 10. The front cross member 52 may extend laterally between the first ends 40A of each of the floor side members 34. That is, the front cross member 52 may not extend laterally and outwardly beyond the front end 40A of the walls 40 disposed on each side of the vehicle.

A rear cross member 54 extends across the vehicle and may be referred to as an axial support for the floor 60. The rear cross member 54 may be used to support an axle of the vehicle as an axle housing.

The space between the rear cross member 54, the front cross member 52 and the walls 40 of the floor side members 34 are used to support a vehicle floor 60 of the vehicle 10 under which a battery module 64 is located. In this example, the vehicle floor 60 is a rear floor for the vehicle 10. As illustrated best in FIGS. 2H and 2I, the battery module 64 may comprise a cover 64A, a floor 64B and battery cells 64C (one of which is represented) disposed therebetween. Cooling channels may also be included in the battery module 64. The vehicle floor 60 may be affixed with adhesive, welding, fasteners or combinations thereof. The contours of the floor 60 correspond to the contours of the high voltage battery 12 and the cover 64A.

A pair of lateral stiffening brackets 62 couple the front cross member 52 to the spar 50. The lateral stiffening brackets 62 have a L-shaped cross section outward from the vertical wall 52A. The lateral stiffening brackets 62 are spaced apart by a gap G. The gap G is where the deformation of the front cross member happens when a side impact occurs.

The lateral stiffening brackets 62 have a first plate 62A and a second plate 62B. The first plate 62A is affixed to the front cross member 52 by way of welds 66. That is, the vertical wall 52A of the front cross member 52 is affixed to the first plate 62A while the second plate 62B is affixed to the flange 52B. Various numbers of welds 66 may be used for coupling the lateral stiffening brackets 62. The lateral stiffening brackets 62 are also affixed to the spars 50 through welds 66. In particular, the plate 62B of the lateral stiffening brackets 62 are coupled to the spars 50.

The walls 40 and, more specifically, the front ends 40A thereof have a longitudinal reinforcement bracket 70 is also generally L-shaped and comprises a first plate 70A and a second plate 70B. The first plate 70A is coupled to the wall 40 by way of welding, in this example. The second plate 70B is coupled to the lateral plate 38 and the spar 50. This may also be performed by way of welding.

The plate 70B may also include a flange 72. The flange 72 extends towards the front of the vehicle and laterally inwardly from the plate 70B.

Figure 2A:
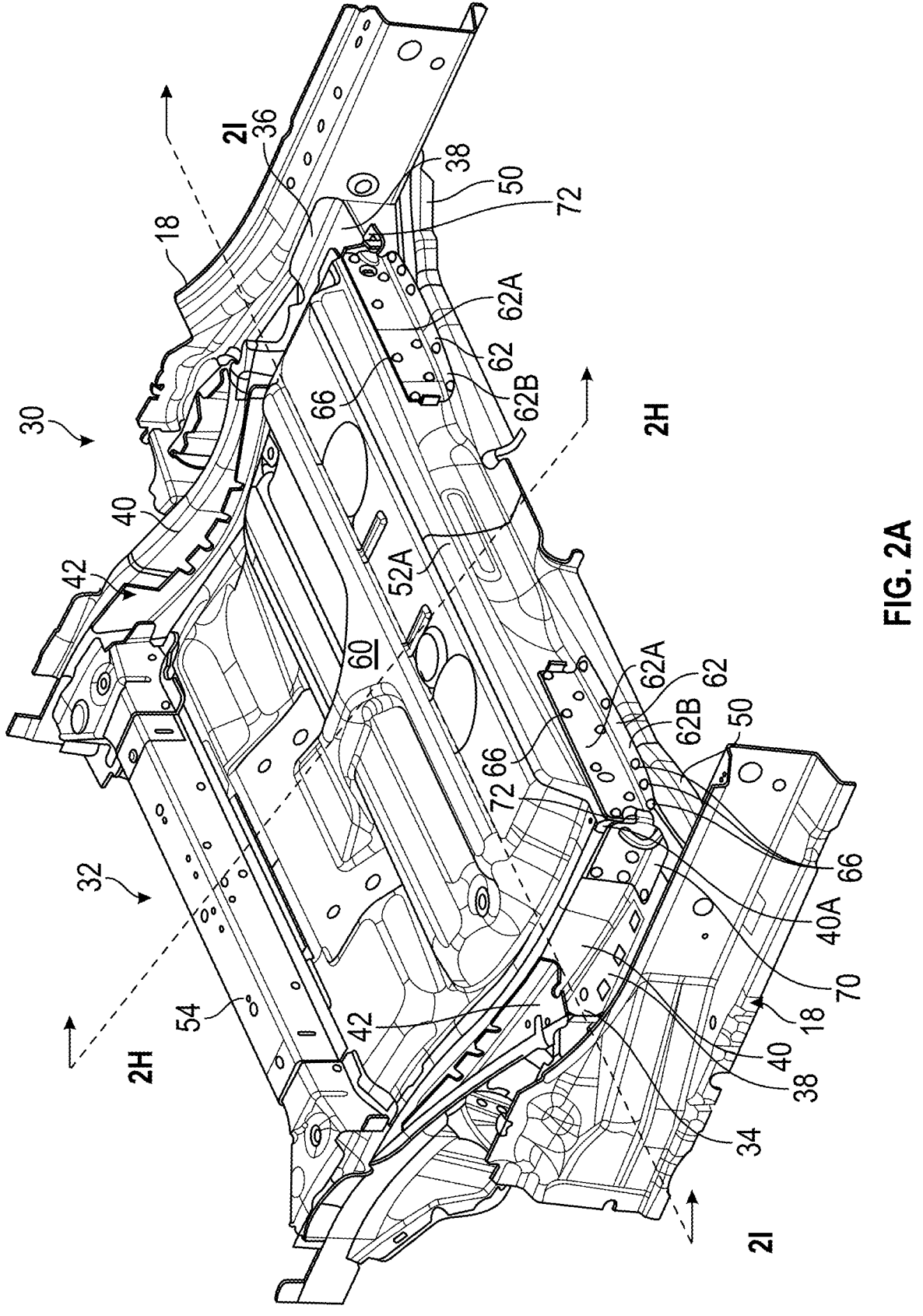
FIG. 2A is a perspective view of the battery securing structure.
Figures 2B, 2C, 2D:
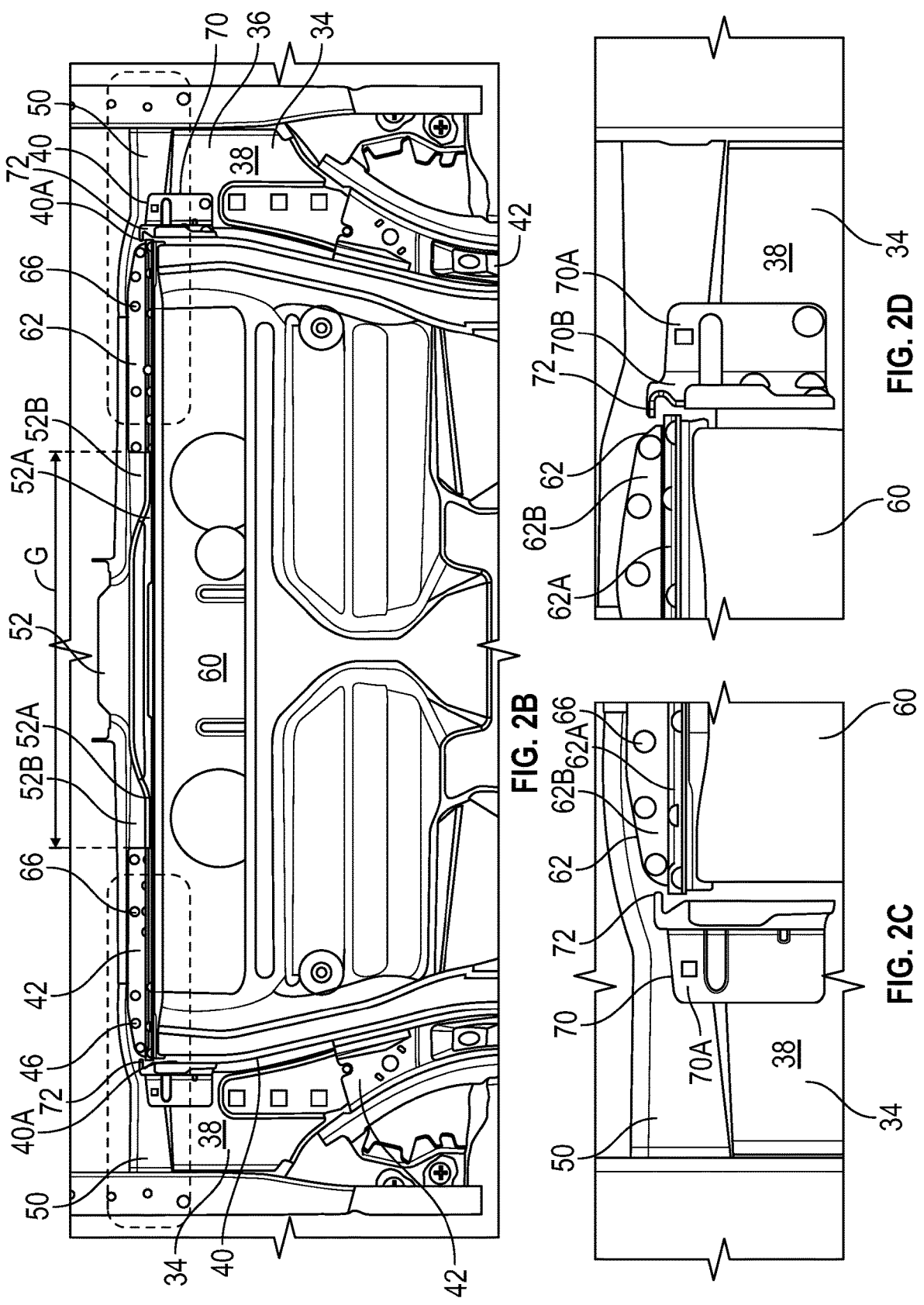
FIG. 2B is a top view of the battery securing structure of FIG. 2A.
FIGS. 2C and 2D are enlarged top views of the corners of the battery securing structure.
Figure 2E:
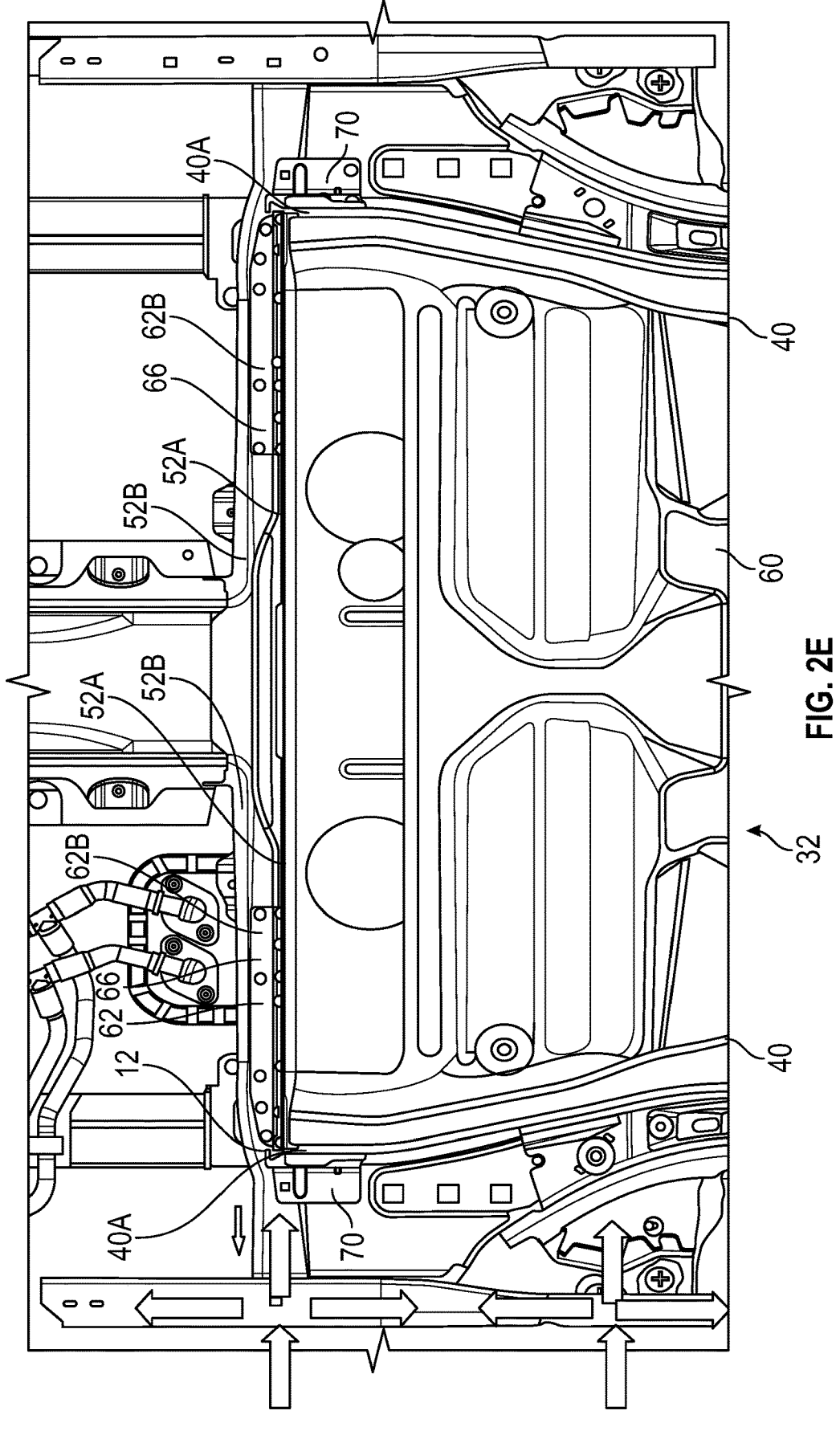
FIG. 2E is an enlarged view of the battery securing structure and the front cross member.
Figures 2F, 2G:
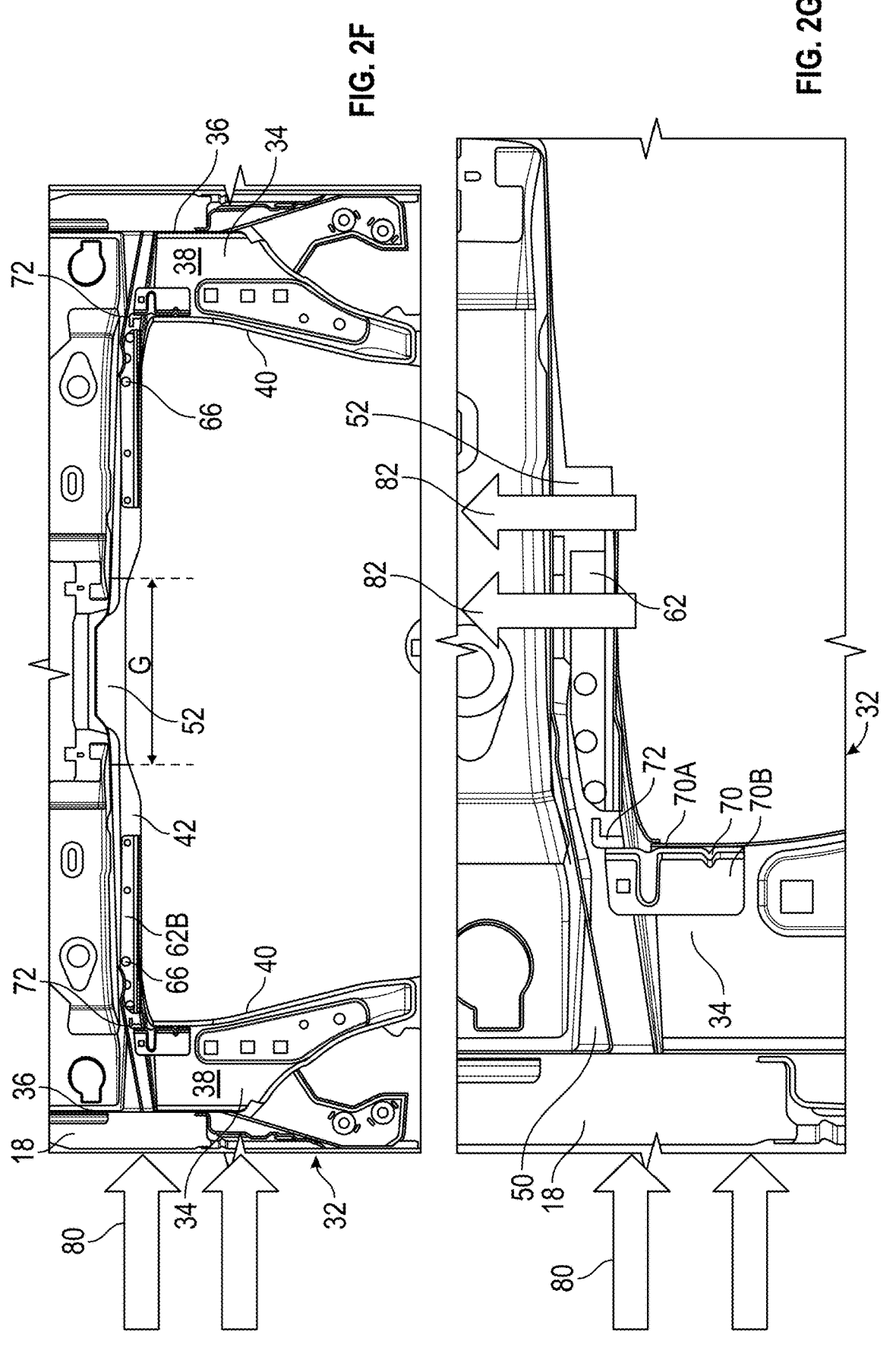
FIG. 2F is a top view of the battery securing structure with side crash forces acting thereon.
FIG. 2G is an enlarged view of a corner of the rear cross member and the battery securing structure with side forces acting thereto.
Figure 2H:
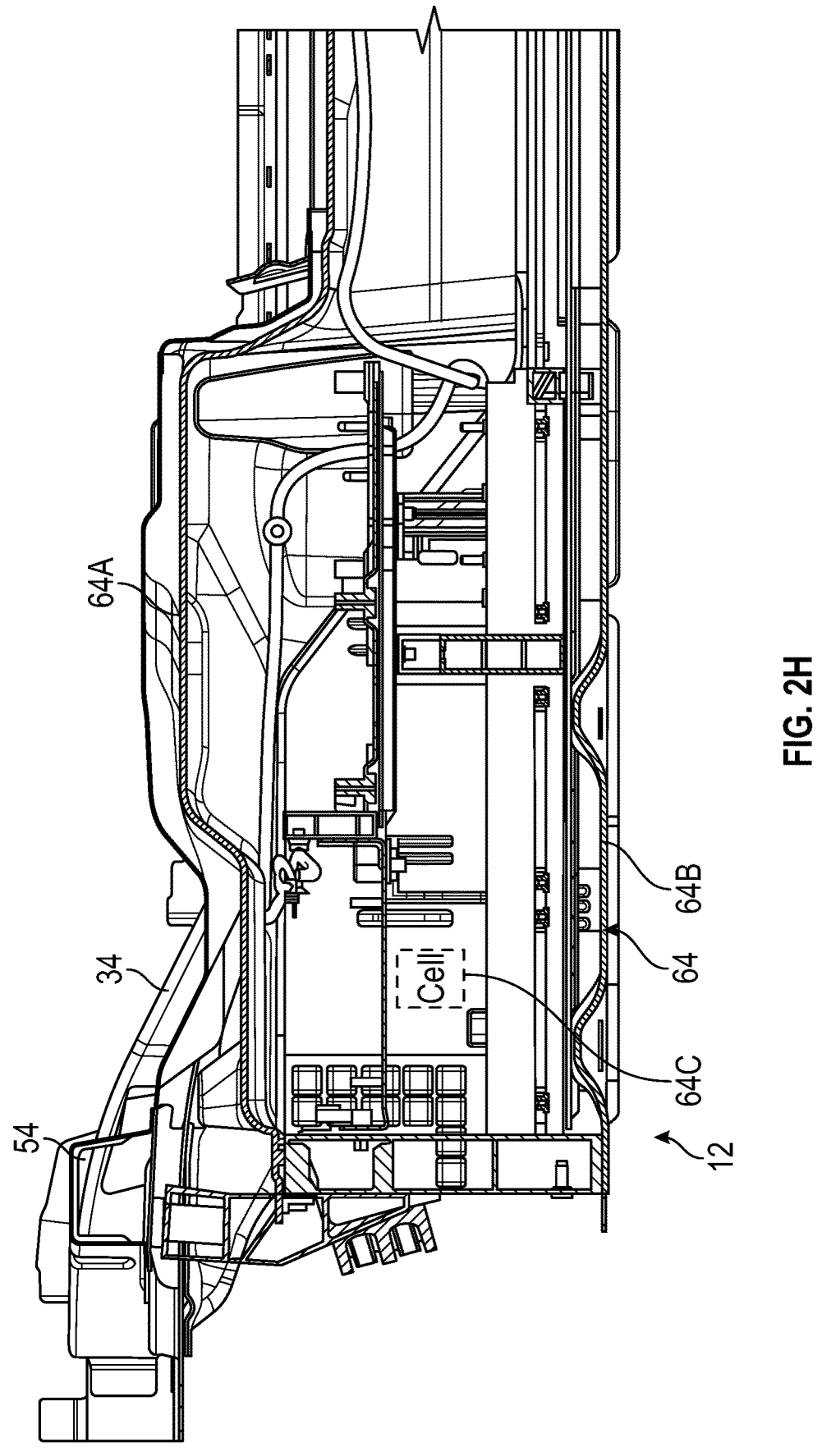
FIG. 2H is a longitudinal cross-sectional view showing the vehicle floor relative to a battery module.
Figure 2I:
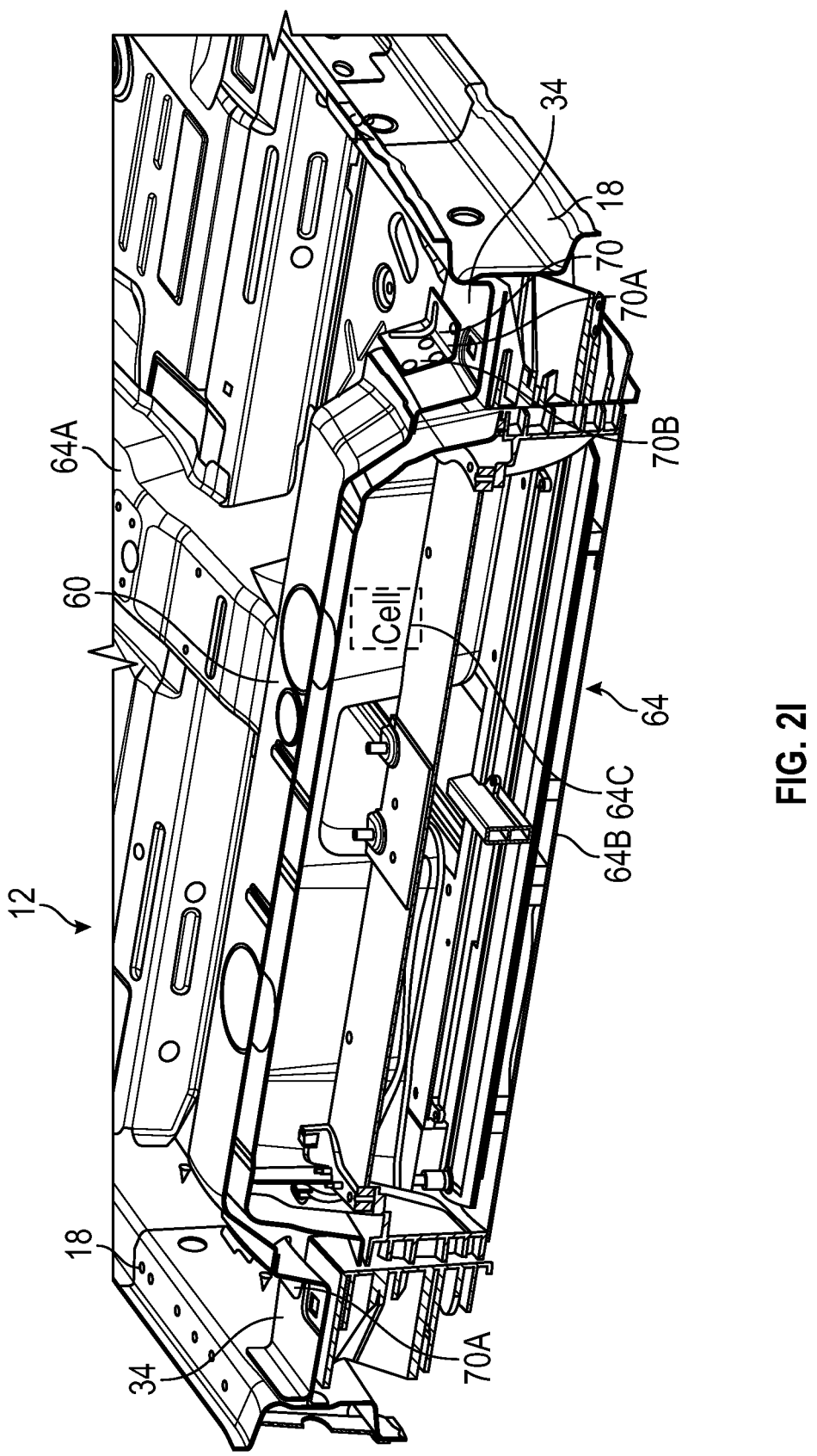
FIG. 2I is a transverse cross-sectional view showing the vehicle floor relative to a battery module.

Referring now to FIGS. 2F and 2G, forces impacting the battery securing structure 32 during a side impact on illustrated by the arrows 80. The side impact forces result in forces illustrated by arrows 82. That is, the front cross member 52 may deform in the direction illustrated by the arrows 82. The cross member 52 and the lateral stiffening brackets 62 allow the rear cross member 54 to deflect frontwards when compression of the floor side members 34 is compressed in the direction of arrows 80.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle structure comprising:
   a first longitudinal support member comprising a first spar;
   a second longitudinal support member comprising a second spar extending toward the first spar;
   a first floor side member having a first front end, said first floor side member disposed adjacent to the first longitudinal support member;
   a second floor side member having a second front end, said second floor side member disposed adjacent to the second longitudinal support member;
   a front cross member extending between the first floor side member and the second floor side member;
   a rear cross member extending between the first floor side member and the second floor side member;
   a floor extending between and coupled to the first floor side member and the second floor side member, a first lateral stiffening bracket coupling the front cross member to the first spar;
   a second lateral stiffening bracket coupling the front cross member to the second spar;
   a first longitudinal reinforcement bracket coupled to the first floor side member and the first spar; and
   a second longitudinal reinforcement bracket coupled to the second floor side member and the second spar.

2. The vehicle structure of claim 1 wherein the rear cross member comprises an axle housing.

3. The vehicle structure of claim 2 wherein the floor is adjacent the axle housing.

4. The vehicle structure of claim 1 wherein the floor is coupled to the front cross member.

5. The vehicle structure of claim 1 wherein the floor is coupled to the front cross member, the first floor side member, and the second floor side member.

6. The vehicle structure of claim 1 wherein the first lateral stiffening bracket comprises an L-shaped cross section.

7. The vehicle structure of claim 1 wherein the first lateral stiffening bracket comprises a first plate coupled to the front cross member and the second lateral stiffening bracket comprises a third plate coupled to the front cross member.

8. The vehicle structure of claim 7 wherein the first lateral stiffening bracket comprises a second plate coupled to the front cross member and the first spar, and the second lateral stiffening bracket comprises a fourth plate coupled the front cross member and the second spar.

9. The vehicle structure of claim 1 wherein the front cross member comprises a vertical wall and a flange portion extending longitudinally forward from the vertical wall.

10. The vehicle structure of claim 9 wherein the first lateral stiffening bracket comprises a first plate coupled to the vertical wall of the front cross member and a second plate coupled to the flange portion and the first spar, and wherein the second lateral stiffening bracket comprises a third plate coupled to the vertical wall and a fourth plate coupled to the flange portion and the second spar.

11. The vehicle structure of claim 10 wherein the first lateral stiffening bracket comprises the second plate coupled to the front cross member and the first spar, and the second lateral stiffening bracket comprises the fourth plate coupled to the front cross member and the second spar.

12. The vehicle structure of claim 1 wherein the front cross member does not extend laterally outward beyond the first front end and the second front end.

13. The vehicle structure of claim 1 wherein the first longitudinal reinforcement bracket comprises a first plate and a second plate.

14. The vehicle structure of claim 13 wherein the first plate is coupled to the first floor side member.

15. The vehicle structure of claim 14 wherein the first plate is coupled to a wall of the first floor side member.

16. The vehicle structure of claim 15 wherein the second plate is coupled to a lateral plate of the first floor side member and the first spar.

17. The vehicle structure of claim 1 wherein the first longitudinal reinforcement bracket comprises a first plate welded to the first floor side member and the first spar, and the first lateral stiffening bracket comprises a third plate welded to the front cross member and a second plate welded to the front cross member and the first spar.

18. The vehicle structure of claim 1 wherein the first lateral stiffening bracket and the second lateral stiffening bracket are spaced apart by a lateral gap on the front cross member.

8

19. A vehicle structure comprising:
a first longitudinal support member comprising a first spar;
a second longitudinal support member comprising a second spar extending toward the first spar;
a first floor side member having a first front end, said first floor side member coupled to the first longitudinal support member;
a second floor side member having a second front end, said second floor side member coupled to the second longitudinal support member;
a front cross member extending between the first floor side member and the second floor side member, said front cross member comprising a vertical wall and a flange;
a rear cross member extending between the first floor side member and the second floor side member;
a floor coupled to the front cross member, the first floor side member, and the second floor side member;
a battery module coupled under the floor;
a first lateral stiffening bracket comprising a first plate coupled to the vertical wall and a second plate coupled to the flange and the first spar;
a second lateral stiffening bracket comprising a third plate coupled to the vertical wall and a fourth plate coupled to the flange and the second spar;
a first longitudinal reinforcement bracket comprising a fifth plate coupled to the first floor side member and a sixth plate coupled a first lateral plate of the first floor side member and the first spar; and
a second longitudinal reinforcement bracket comprising a seventh plate coupled to the second floor side member and an eighth plate coupled a second lateral plate of the first floor side member and the second spar.

20. The vehicle structure of claim 19 wherein the fifth plate is coupled to a first wall of the first floor side member and the seventh plate is coupled to a second wall of the second floor side member.

* * * * *